N. E. AUSTIN.
IRRIGATION BOX.
APPLICATION FILED MAR. 23, 1912.

1,052,121.

Patented Feb. 4, 1913.

WITNESSES:

INVENTOR
Nelson E. Austin.
BY
ATTORNEY

UNITED STATES PATENT OFFICE.

NELSON E. AUSTIN, OF DANBURY, CONNECTICUT.

IRRIGATION-BOX.

1,052,121. Specification of Letters Patent. Patented Feb. 4, 1913.

Application filed March 23, 1912. Serial No. 685,683.

*To all whom it may concern:*

Be it known that I, NELSON E. AUSTIN, a citizen of the United States, residing in the city of Danbury, county of Fairfield, State of Connecticut, have invented certain new and useful Improvements in Irrigation-Boxes; and I do declare the following to be a full, clear, and exact description of the invention, such as will enable others skilled in the art to which it appertains to make and use the same.

My invention relates to certain improvements in irrigation, but more particularly has reference to an improvement in irrigation boxes, any number of which may be located at proper places and supplied with water by means of pipes which connect all the boxes in one system.

The object of my improvement is to prevent any deluging of the ground to be irrigated such as would not only waste the water but would be unproductive of the best results, while at the same time the water supply is utilized for the purposes of irrigation in a steady and unfailing supply, and with these ends in view my invention consists in certain details of construction and combination of parts hereinafter fully described and then particularly pointed out in the claims which conclude this description.

Figure 1:
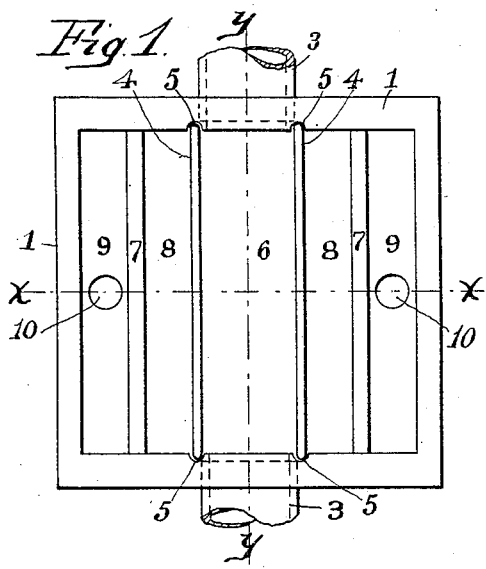
Figure 2:
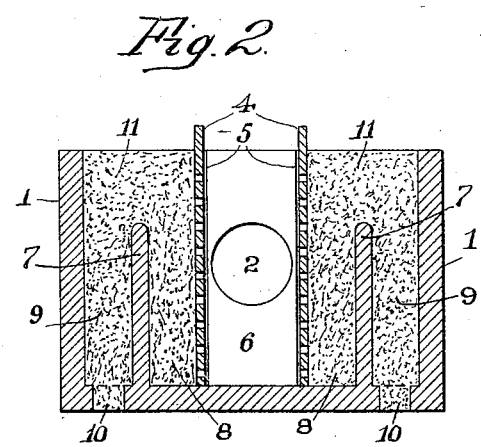
Figure 3:
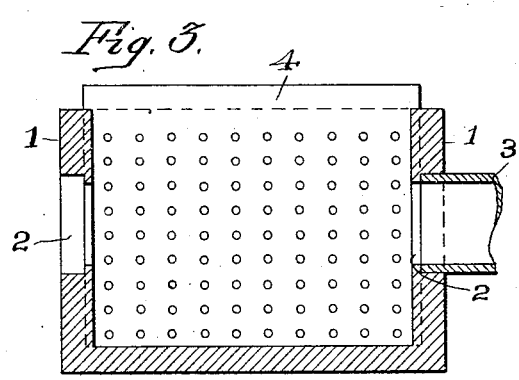
Figure 4:
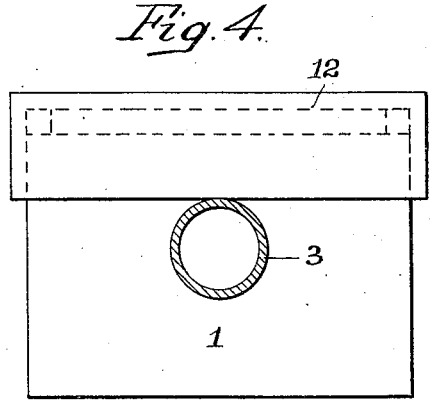
Figure 5:
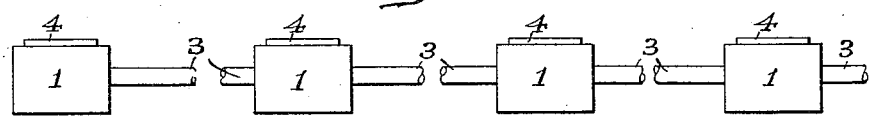

In the accompanying drawing Figure 1 is a plan view of one of my improved irrigation boxes; Fig. 2 a section at the line $x$, $x$, of Fig. 1; Fig. 3 a section at the line $y$, $y$, of Fig. 1; Fig. 4 an elevation of my improved box showing the same supplied with a cover, and Fig. 5 an elevation showing several of my boxes connected together by a water supply pipe.

Similar numerals of reference denote like parts in the several figures of the drawing.

1 is the box, preferably of rectangular form and provided at two of its opposite sides with openings 2 for the supply of water, and 3 are the pipes which extend within these openings and through which the water is supplied from any convenient source.

4 are perforated plates which are removably secured within grooves 5 in two opposite walls of the box, these plates being spaced apart and inclosing a waterway 6 in the box into which waterway the openings 2 lead.

7 are partitions which rise from the bottom of the box about midway between the plates and the end walls of said box, said partitions terminating at the top at a distance below the top of the box so that it will be readily understood that these partitions form inner chambers 8 and outer chambers 9 between each of the plates 4 and the walls of the box.

10 are openings in the bottom of the box which lead directly from the outer chambers 9.

The interior of the box, except the waterway inclosed by the plates 4, is filled with clean sand 11, and as the water passes from the waterway through the perforated plates it will soak the sand in the inner chambers 8, and the water will be drawn up into the sand at the top of the box and over the partitions and down through the sand in the outer chambers and will thence steadily and uniformly pass through the openings 10 into the soil to be irrigated. One of these boxes may be located near any convenient tree or shrub and the boxes may all be connected up by the water pipes in one system, so that constant irrigation will be effected by the boxes. These boxes are preferably placed on top of the ground, but in the event that it becomes necessary to bury them together with the pipes beneath the level of the ground I preferably supply each box with a cover 12 (shown at Fig. 4) so that the clean sand within the boxes will not become contaminated with the soil.

Having thus described my invention what I claim as new and desire to secure by Letters Patent is:—

1. In an irrigating system, a water distributing box having pipe openings in opposite walls, perforated partitions removably mounted in the box, said partitions being arranged in spaced parallel relation and forming a central chamber with which said openings communicate, said box being provided with imperforate partitions adjacent the perforated partitions and forming chambers in each side of the box, the imperforate partitions terminating short of the top of the box to permit water to pass from one side chamber to the adjoining side chamber, one chamber at each side of the box being provided with a water outlet, and means in said side chambers to cause water to percolate therethrough.

2. In an irrigation system, a distributer box provided with a central chamber having perforated side walls, said chamber having its ends provided with means for placing the same in communication with a source of water supply, partitions within the box on each side of the central chamber and forming side chambers, said partitions causing the water to pursue a tortuous path when passing from one side chamber to the adjoining side chamber, one chamber at each side of the box having a water discharge outlet in its base, and means in the side chambers to cause water to percolate therethrough.

3. In an irrigating system, a distributing box having the inner surface of each end wall provided with a pair of spaced parallel vertical grooves, perforated partitions removably mounted in the grooves and forming a central chamber, the central chamber being provided with means for placing the same in communication with a source of water supply, means for sub-dividing the sides of the box into pairs of side chambers having communication with each other through their top portions, one member of each pair of side chambers being provided with a water outlet in its base, a filling for the side chambers to cause the water to percolate therethrough, and a cover for the box.

4. In an irrigating system, a distributer therefor provided with a central chamber having perforated side walls and side partitions that terminate short of the top of the distributer to form side chambers arranged in pairs, the members of each pair having communications only at their top portions, one chamber at each side of the distributer being provided with a water outlet, and means in the side chambers to cause the water to percolate from one side chamber to the adjoining side chamber.

5. In an irrigating system, a distributing box, central partitions removably mounted therein, said partitions being perforated and arranged in spaced parallel relation and forming a central chamber, the central chamber being provided with means for placing the same in communication with a source of water supply, partitions sub-dividing the sides of the box into side chambers, said partitions being imperforate and terminating short of the top of the box to permit adjoining chambers to have communication only at their tops, one chamber at each side having its base provided with a water outlet, the side chambers being filled with porous material to cause the water to percolate therethrough, and a cover for the box.

In testimony whereof I affix my signature in presence of two witnesses.

NELSON E. AUSTIN.

Witnesses:
 HENRY C. WILSON,
 CHAS. W. MURPHY.

---

Copies of this patent may be obtained for five cents each, by addressing the "Commissioner of Patents, Washington, D. C."